US006586695B2

(12) United States Patent
Sato et al.

(10) Patent No.: US 6,586,695 B2

(45) Date of Patent: Jul. 1, 2003

(54) ELECTRONIC APPARATUS INCLUDING KEYBOARD WITH KEY SWITCH DEVICE

(75) Inventors: Hirofumi Sato, Gifu (JP); Isao Mochizuki, Kaizu-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/244,411

(22) Filed: Sep. 17, 2002

(65) Prior Publication Data

US 2003/0057080 A1 Mar. 27, 2003

(30) Foreign Application Priority Data

Sep. 17, 2001 (JP) ....................................... 2001-281633

(51) Int. Cl.[7] ...................... H01H 13/705; H01H 13/14; G06F 3/02

(52) U.S. Cl. ....................... 200/344; 200/5 A; 200/517; 361/679; 361/680

(58) Field of Search ......................... 200/5 A, 512–517, 200/341, 344, 345; 361/379–681; 400/495

(56) References Cited

U.S. PATENT DOCUMENTS

| | | | | |
|---|---|---|---|---|
| 5,463,195 A | | 10/1995 | Watanabe et al. | 200/5 A |
| 5,504,283 A | | 4/1996 | Kako et al. | 200/5 A |
| 5,512,719 A | | 4/1996 | Okada et al. | 200/344 |
| 5,695,047 A | | 12/1997 | Tanahashi | 200/344 |
| 6,072,134 A | | 6/2000 | Sato et al. | 200/344 |
| 6,288,457 B1 | | 9/2001 | Kako et al. | 307/119 |
| 6,371,671 B1 | | 4/2002 | Sato et al. | 400/495 |
| 6,417,470 B2 | | 7/2002 | Kako et al. | 200/344 |
| 6,455,794 B2 | * | 9/2002 | Sato et al. | 200/344 |

FOREIGN PATENT DOCUMENTS

| | | |
|---|---|---|
| JP | A 9-190735 | 7/1997 |
| JP | A 2001-283676 | 10/2001 |

* cited by examiner

*Primary Examiner*—J. R. Scott

(74) *Attorney, Agent, or Firm*—Oliff & Berridge, PLC

(57) ABSTRACT

In a key switch device, an outer wall of an engagement member of a key top is interposed between a pinch shaft and an upper shaft of a first link member, while an outer wall of an engagement member of the key top is interposed between a pinch shaft and an upper shaft of a second link member. When the key top is pulled up, the pinch shaft and the upper shaft of the first link member cooperate with each other to pinch the outer wall of the engagement member, and the pinch shaft and the upper shaft of the second link member cooperate with each other to pinch the outer wall of the engagement member. Thus, when the key top is pulled up, the key top is removed together with the first and second link members, thereby facilitating reassembly and maintenance of the key switch device.

19 Claims, 8 Drawing Sheets

ELECTRONIC APPARATUS INCLUDING KEYBOARD WITH KEY SWITCH DEVICE

BACKGROUND OF THE INVENTION

1. Field of Invention

The invention relates to a key switch device in which a key top is vertically guided by a pair of link members to perform a switching operation, a keyboard provided with the key switch device, and an electronic apparatus provided with the key switch device. The invention relates more particularly to a key switch device in which a key top, when pulled up, is removed together with a pair of link members, thereby facilitating reassembling and maintenance of the key switch device, a keyboard provided with the key switch device, and an electronic apparatus provided with the key switch device.

2. Description of Related Art

Conventionally, various types of key switch devices for a keyboard have been proposed with the trend toward more compact and thinner notebook-size personal computers, which belong to an electronic apparatus. For example, Japanese Laid-Open Patent Publication No. 9-190735 discloses a key switch device in which a key top is vertically guided by first and second links.

In the disclosed key switch device, rotating shanks formed at upper ends of arms, which constitute the first link, are rotatably supported by bearing portions of the key top, and a sliding shank, formed between the arms, is slidably supported by slide guides of a housing. Also, rotating shanks formed at upper ends of arms, which constitute the second link, are rotatably supported by bearing portions of the key top, and a sliding shank formed between the arms is slidably supported by slide guides of the housing.

In a key switch device, an outer wall of an engagement member of a key top is interposed between a pinch shaft and an upper shaft of a first link member, while an outer wall of an engagement member of the key top is interposed between a pinch shaft and an upper shaft of a second link member. When the key top is pulled up, the pinch shaft and the upper shaft of the first link member cooperate with each other to pinch the outer wall of the engagement member, and the pinch shaft and the upper shaft of the second link member cooperate with each other to pinch the outer wall of the engagement member. Thus, when the key top is pulled up, the key top is removed together with the first and second link members, thereby facilitate reassembling and maintenance of the key switch device.

In such a key switch device, the key top is vertically guided by the first and second links so that the key top vertically moves while maintaining a horizontal state regardless of which part of the key top is pressed.

As shown in FIG. 14 of Japanese Laid-Open Patent publication No. 9-190735, each bearing portion in which each rotating shank of the first and second links is rotatably supported has an entrance upwardly tapered off and an inverted U-shaped recess continued from the entrance.

Each rotating shank of the first and second links is readily supported by the bearing portion shaped as described above. Each rotating shank is guided by the tapered entrance and snapped into the inverted U-shaped recess.

SUMMARY OF THE INVENTION

The key top sometimes needs to be removed to perform maintenance or the like. In the above-described conventional key switch device, the rotating shanks of the first and second links are supported by the bearing portions by the elastic force of the bearing portions, which is just great enough to permit the rotating shanks to be snapped in. Thus, in many cases, the holding force of the slide guides that hold the first and second links becomes greater than the holding force of the bearing portions that hold the rotating shanks.

As a result, when removal of the key top is attempted, only the key top may be detached leaving the first and second links at the housing. If this happens, because the first and second links are not interconnected, the first and second links separate.

If the first and second links separate, it is extremely difficult to reassemble the key top to the first and second links because the first and second links are very small parts and hard to handle. In some cases, the key switch device cannot be reassembled.

The invention addresses the forgoing problems and provides a key switch device in which a key top, when pulled up, is removed together with a pair of link members, thereby facilitating reassembling and maintenance of the key switch device, a keyboard provided with the key switch device, and an electronic apparatus provided with the key switch device.

According to a first aspect of the invention, a key switch device includes a key top; a guide member disposed below the key top for supporting the key top to guide vertical movement of the key top, the guide member having a first link member provided with a first upper shaft and a first lower shaft and a second link member provided with a second upper shaft and a second lower shaft; and a lower engagement member disposed far below the key top and next to the guide member, the lower engagement portion having a first lower engagement portion in which the first lower shaft is slidably engaged and a second lower engagement portion in which the second lower shaft is slidably engaged; a first upper engagement member that links the first upper shaft to the key top such that the first upper shaft is pivotally engaged in the first upper engagement member; a second upper engagement member that links the second upper shaft to the key top such that the second upper shaft is pivotally engaged in the second upper engagement member; and a switching portion that performs a switching operation in accordance with the vertical movement of the key top. The key switch device further includes a first pinch portion provided in the first link member such that part of the first upper engagement member is interposed between the first pinch portion and the first upper shaft; and a second pinch portion provided in the second link member such that part of the second upper engagement member is interposed between the second pinch portion and the second upper shaft, wherein the parts of the first and second upper engagement members are pinched therebetween when the key top is pulled up.

In the key switch device structured as described above, the first link member is provided with the first pinch portion such that a part of the first upper engagement member is interposed between the first pinch portion and the first upper shaft, which is pivotally engaged in the first upper engagement member on the underside of the key top. Likewise, the second link member is provided with the second pinch portion such that a part of the second upper engagement member is interposed between the second pinch portion and the second upper shaft, which is pivotally engaged in the second upper engagement member. When the key top is pulled up to perform maintenance of the key switch device, the pulling-up force is exerted such that the first pinch portion cooperates with the first upper shaft to pinch therebetween the part of the first upper engagement member, and that the second pinch portion cooperates with the second upper shaft to pinch therebetween the part of the second upper engagement member. The holding force for the key top generated between the upper shafts of the first and second link members and the first and second upper engagement members becomes greater than the holding force for the engagement member generated between the lower shafts of the first and second link members and the first and second lower engagement portions of the engagement member.

Thus, when the key top is pulled up, the key top is not removed leaving the first and second link members at the engagement member. The key top is always removed together with the first and second link members, thereby facilitating maintenance and reassembly of the key switch device.

According to a second aspect of the invention, an electronic apparatus includes a keyboard provided with a key switch device for entering data including characters, symbols, and others, a display that displays thereon the characters, symbols, and others, and a control unit that controls the display to display thereon the characters, symbols, and others based on the data entered from the keyboard. The key switch device provided on the keyboard includes a key top; a guide member disposed below the key top for supporting the key top to guide vertical movement of the key top, the guide member having a first link member provided with a first upper shaft and a first lower shaft and a second link member provided with a second upper shaft and a second lower shaft; and a lower engagement member disposed far below the key top and next to the guide member, the lower engagement portion having a first lower engagement portion in which the first lower shaft is slidably engaged and a second lower engagement portion in which the second lower shaft is slidably engaged; a first upper engagement member that links the first upper shaft to the key top such that the first upper shaft is pivotally engaged in the first upper engagement member; a second upper engagement member that links the second upper shaft to the key top such that the second upper shaft is pivotally engaged in the second upper engagement member; and a switching portion that performs a switching operation in accordance with the vertical movement of the key top. The key switch device further includes a first pinch portion provided in the first link member such that part of the first upper engagement member is interposed between the first pinch portion and the first upper shaft; and a second pinch portion provided in the second link member such that part of the second upper engagement member is interposed between the second pinch portion and the second upper shaft, wherein the parts of the first and second upper engagement members are pinched therebetween when the key top is pulled up.

In the electronic apparatus structured as described above, when characters, symbols, and others are entered using the key switch provided on the keyboard, the characters, symbols, and others are displayed on the display under the control of the control unit based on the data entered from the keyboard. The electronic apparatus includes a keyboard provided with a key switch device according to the above-described first aspect of the invention. Thus, in the key switch device of this electronic apparatus, similarly to the above-described key switch device, the first link member is provided with the first pinch portion such that a part of the first upper engagement member is interposed between the first pinch portion and the first upper shaft, which is pivotally engaged in the first upper engagement member on the underside of the key top. Likewise, the second link member is provided with the second pinch portion such that a part of the second upper engagement member is interposed between the second pinch portion and the second upper shaft, which is pivotally engaged in the second upper engagement member. When the key top is pulled up to perform maintenance of the key switch device, the pulling-up force is exerted such that the first pinch portion cooperates with the first upper shaft to pinch therebetween the part of the first upper engagement member, and that the second pinch portion cooperates with the second upper shaft to pinch therebetween the part of the second upper engagement member. The holding force to the key top generated between the upper shafts of the first and second link members and the first and second upper engagement members becomes greater than the holding force to the engagement member generated between the lower shafts of the first and second link members and the first and second lower engagement portions of the engagement member.

Thus, when the key top is pulled up, the key top is not removed leaving the first and second link members at the engagement member. The key top is always removed together with the first and second link members, thereby facilitating maintenance and reassembly of the key switch device.

According to a third aspect of the invention, a key switch device includes a key top; a guide member disposed below the key top for supporting the key top to guide vertical movement of the key top, the guide member having a first link member provided with a first upper shaft and a first lower shaft and a second link member provided with a second upper shaft and a second lower shaft, the first and second link members are engaged with each other at their upper ends; a lower engagement member disposed far below the key top and next to the guide member, the lower engagement portion having a first lower engagement portion in which the first lower shaft is slidably engaged and a second lower engagement portion in which the second lower shaft is slidably engaged; a first upper engagement member that links the first upper shaft to the key top such that the first upper shaft is pivotally engaged in the first upper engagement member; a second upper engagement member that links the second upper shaft to the key top such that the second upper shaft is pivotally engaged in the second upper engagement member; a switching portion that performs a switching operation in accordance with the vertical movement of the key top. The key switch device further includes a first pinch portion provided in the first link member such that part of the first upper engagement member is interposed between the first pinch portion and the first upper shaft, wherein the part of the first upper engagement member is pinched therebetween when the key top is pulled up.

In the key switch device structured as described above, the first link member is provided with the first pinch portion such that a part of the first upper engagement member is interposed between the first pinch portion and the first upper shaft, which is pivotally engaged in the first upper engagement member on the underside of the key top. When the key top is pulled up to perform maintenance of the key switch device, the pulling-up force is exerted such that the first pinch portion cooperates with the first upper shaft to pinch therebetween the part of the first upper engagement member. The holding force for the key top generated between the first upper shaft of the first link member and the first upper engagement member becomes greater than the holding force for the engagement member generated between the lower shafts of the first and second link members and the first and second lower engagement portions of the engagement member. At this time, because the first and second link members are engaged with each other at their upper ends, the second link member moves unitarily with the first link member.

Thus, when the key top is pulled up, the key top is not removed leaving the first and second link members at the engagement member. The key top is always removed together with the first and second link members, thereby facilitating maintenance and reassembly of the key switch device.

According to a fourth aspect of the invention, an electronic apparatus includes a keyboard provided with a key switch device for entering data including characters, symbols, and others, a display that displays thereon the characters, symbols, and others, and a control unit that controls the display to display thereon the characters, symbols, and others based on the data entered from the keyboard. The key switch device provided on the keyboard includes a key top; a guide member disposed below the key top for supporting the key top to guide vertical movement of the key top, the guide member having a first link member provided with a first upper shaft and a first lower shaft and a second link member provided with a second upper shaft and a second lower shaft, the first and second link members are engaged with each other at their upper ends; a lower engagement member disposed far below the key top and next to the guide member, the lower engagement portion having a first lower engagement portion in which the first lower shaft is slidably engaged and a second lower engagement portion in which the second lower shaft is slidably engaged; a first upper engagement member that links the first upper shaft to the key top such that the first upper shaft is pivotally engaged in the first upper engagement member; a second upper engagement member that links the second upper shaft to the key top such that the second upper shaft is pivotally engaged in the second upper engagement member; a switching portion that performs a switching operation in accordance with the vertical movement of the key top. The key switch device further includes a first pinch portion provided in the first link member such that part of the first upper engagement member is interposed between the first pinch portion and the first upper shaft, wherein the part of the first upper engagement member is pinched therebetween when the key top is pulled up.

In the electronic apparatus structured as described above, when characters, symbols, and others are entered using the key switch provided on the keyboard, the characters, symbols, and others are displayed on the display under the control of the control unit based on the data entered from the keyboard. In this case, the electronic apparatus includes a keyboard provided with a key switch device according to the third aspect of the invention. Thus, in the key switch device in this electronic apparatus, similarly to the above-described key switch device, the first link member is provided with the first pinch portion such that a part of the first upper engagement member is interposed between the first pinch portion and the first upper shaft, which is pivotally engaged in the first upper engagement member on the underside of the key top. When the key top is pulled up to perform maintenance of the key switch device, the pulling-up force is exerted such that the first pinch portion cooperates with the first upper shaft to pinch therebetween the part of the first upper engagement member. The holding force for the key top generated between the first upper shaft of the first link member and the first upper engagement member becomes greater than the holding force for the engagement member generated between the lower shafts of the first and second link members and the first and second lower engagement portions of the engagement member. At this time, because the first and second link members are engaged with each other at their upper ends, the second link member moves with the first link member.

Thus, when the key top is pulled up, the key top is not removed leaving the first and second link members at the engagement member. The key top is always removed together with the first and second link members, thereby facilitating maintenance and reassembly of the key switch device.

BRIEF DESCRIPTION OF THE DRAWINGS

A preferred embodiment of the invention will be described in detail with reference to the following figures, in which like elements are labeled with like numbers in which.

DETAILED DESCRIPTION OF PREFERRED EMBODIMENTS

A key switch device, a keyboard, and an electronic apparatus according to one embodiment of the invention will be described with reference to the accompanying drawings.

Figure 1A:
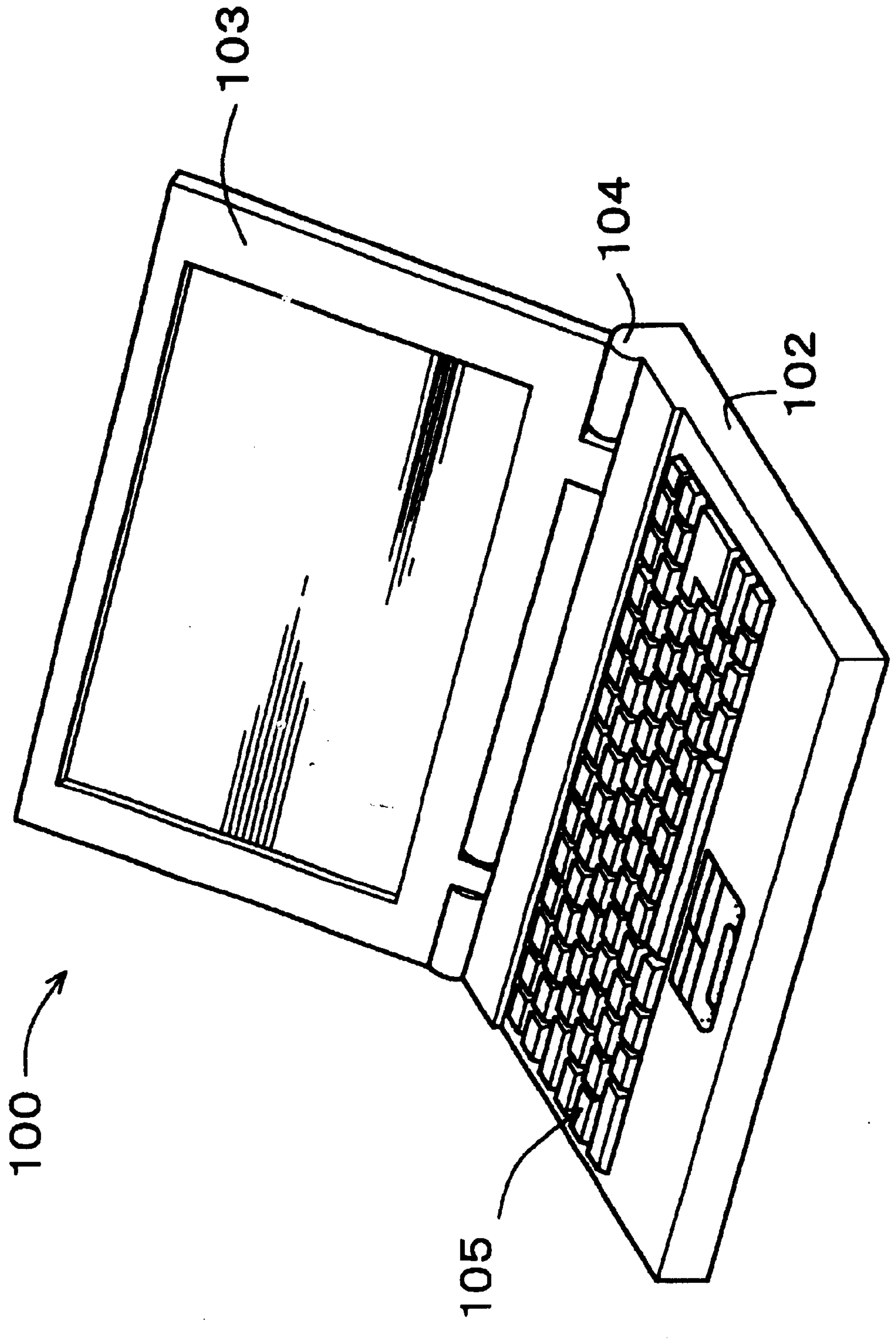
FIG. 1A is a perspective view of a notebook-size personal computer.
Figure 1B:
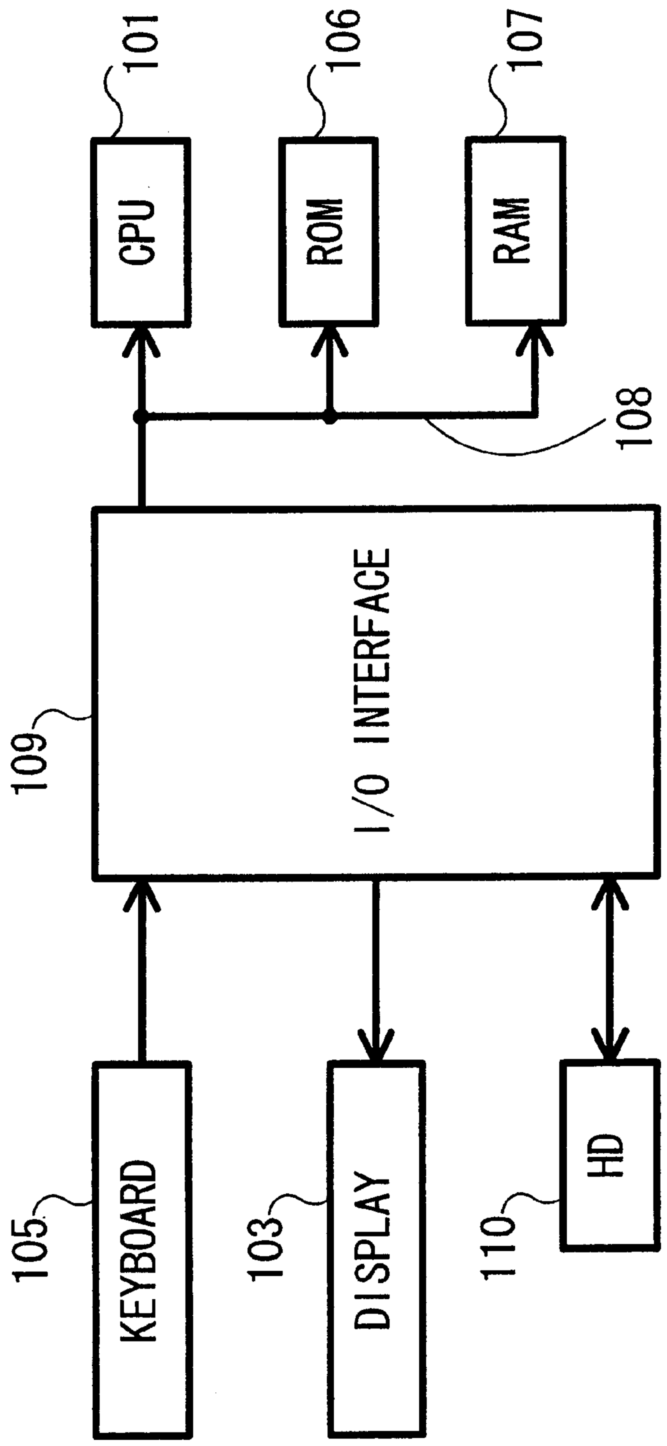
FIG. 1B is a block diagram showing the electric structure of the notebook-size personal computer.

Referring first to FIGS. 1A and 1B, a notebook-size personal computer, as an electronic apparatus, according to one embodiment of the invention will be described. FIG. 1A is a perspective view of the notebook-size personal computer, and FIG. 1B is a block diagram showing the electric structure of the computer.

In FIG. 1A, a notebook-size personal computer 100 basically includes a main unit 102 containing a CPU 101 (FIG. 1B) for conducting various processes, a display 103 mounted on the main unit 102. The display 103 is pivotally supported by a connecting portion 104 of the main unit 102 such that the display 103 is opened and closed with reference to the main unit 102. The main unit 102 is provided with a keyboard 105 having a plurality of key switch devices arranged thereon.

In FIG. 1B, the CPU 101 is connected, through a bus 108, to a ROM 106 that stores programs for controlling each section of the personal computer 100 and to a RAM 107 that stores various data. The CPU 101 is also connected to an input/output (I/O) interface 109 through the bus 108. The I/O interface 109 is connected to the display 103, the keyboard 105, and a hard disk device 110 that stores programs for word processing, tabular calculations and other operations. The CPU 101 reads the programs from the hard disk device 110 and executes the programs in response to data entered from the keyboard 105, and controls the display 103 to display thereon characters, symbols, and other representations.

Figure 2:
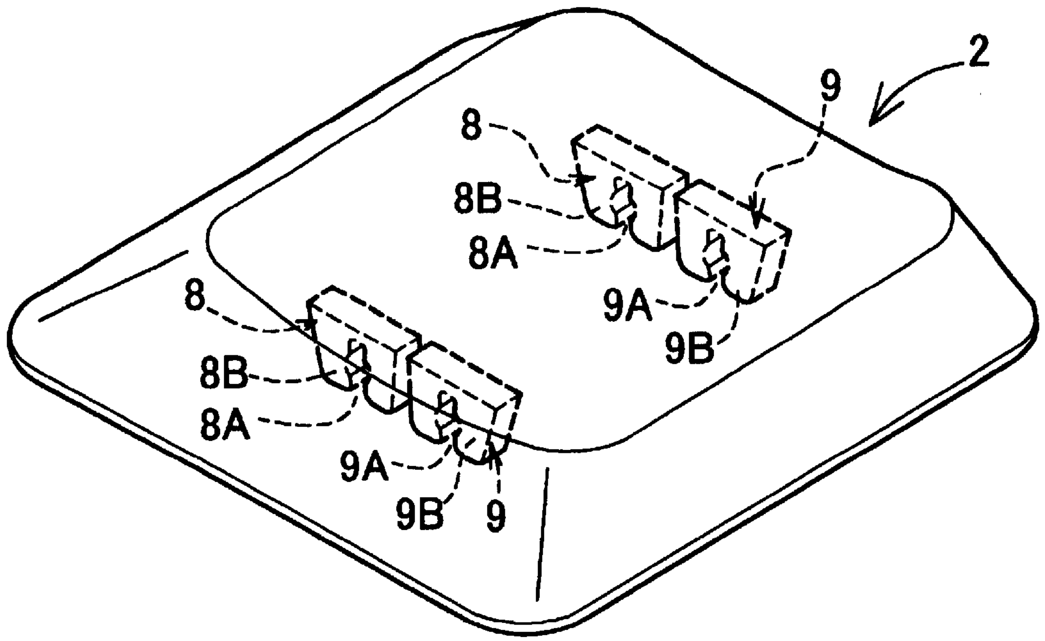
FIG. 2 is an exploded perspective view of a key switch device according to a first embodiment of the invention.
Figure 2:
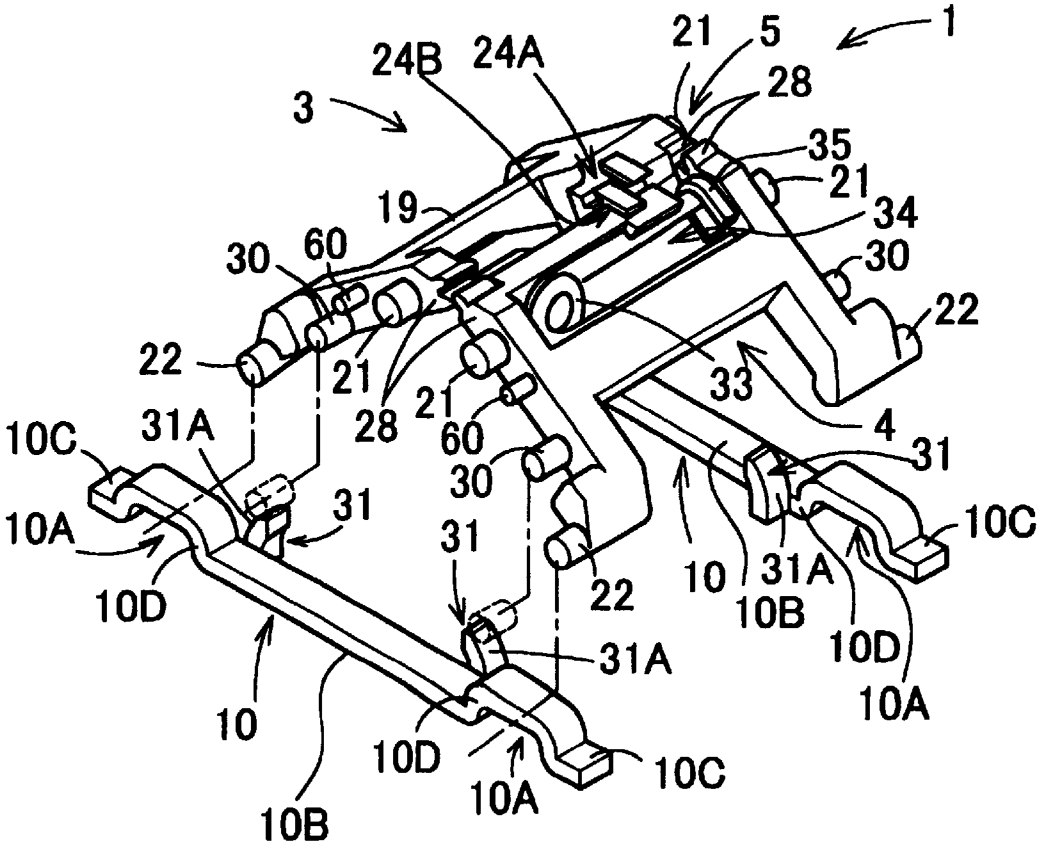

Referring now to FIG. 2, a first embodiment of a key switch device according to a first embodiment provided on the keyboard 105 of the notebook-size computer 100 will be described. FIG. 2 is an exploded perspective view of the key switch device.

As shown in FIG. 2, a key switch device 1 basically includes a key top 2, a guide member 5 having a pair of link members, that is a first link member and a second link member 3, 4, that support and guide the key top 2 in its vertical movement, and a membrane switch sheet 7 (FIG. 5) provided below the guide member 5 and disposed on a support plate 6.

The key top 2 is formed of resin, such as an ABS resin and a character and/or a numeric is printed on the upper face of the key top 2. On the underside of the key top 2, two engagement members 8, 8 are formed integrally with key top 2 to be associated with the first link member 3, and two engagement members 9, 9 are formed integrally with the key top 2 to be associated with the second link member 4. Each of the engagement members 8, 9 is provided with an engagement groove 8A, 9A. Each upper shaft 21 of the first link member 3 is pivotally engaged in the associated engagement groove 8A, while each upper shaft 21 of the second link member 4 is pivotally engaged in the associated engagement groove 9A. The upper shafts 21 will be described later. Additionally, a recess 50 is provided on the underside of the key top 2, as shown in FIG. 5. The recess 50 contacts the upper ends of the first and second link members 3, 4 and positions them in a stable manner when the key top 2 is in a non-depression state. Whereas, in this embodiment, the engagement members 8, 9 are formed integrally with the key top 2, they may be formed separately from the key top 2.

The guide member 5 is formed by assembling the first and second link members 3, 4 with each other. The first and second link members 3, 4 have a similar, but slightly different, structure to each other. The detailed structure of the first and second link members 3, 4 will be described later.

As shown in FIG. 5, a membrane switch sheet 7 is provided below the guide member 5 and disposed on a support plate 6, which is a thin plate made of aluminum, steel, or other metal. The membrane switch sheet 7 has a three-layer structure and includes an upper film sheet, a lower film sheet, and a film spacer interposed therebetween. The upper film sheet is formed, on its underside, with movable electrodes. The lower film sheet is formed with a switching circuit pattern including fixed electrodes made of copper foil or conductive ink. The film spacer is formed with switching holes associated with the fixed and movable electrodes. The structure of such a membrane switch sheet is known and the same as the structure disclosed in the specification and drawings of Japanese Patent Application No. 2000-99148 (U.S. Pat. No. 6,455,794), the contents of which are hereby incorporated by reference Two chip-shaped engagement members 10 made of metal, resin, or other materials are bonded with an adhesive to the upper face of the upper switch sheet so as to be located on both sides of the associated movable electrode. Each chip-shaped engagement member 10 is formed to a unit length of the key switch device. Each engagement member 10 has the same structure. Elongated engagement grooves 10A are formed on both sides of a bonding portion 10B at the center. Additionally, bonding portions 10C are provided on outer sides of the engagement grooves 10A. The engagement members 10 are disposed off the center of the key top 2 and near the lower edges of the key top 2.

Each lower shaft 22 of the first link member 3 and each lower shaft 22 of the second link member 4 is slidably engaged an the associated engagement groove 10A. As will be described later, when the key top 2 is in the non-depression state, each lower shaft 22 of the first link member 3 and each lower shaft 22 of the second link member 4 is in contact with the associated wall portion 10D and keeps the key top 2 at the non-depression position.

In addition, two wall members 31 are formed integrally with each engagement member 10, at the inner edge near the engagement grooves 10A. As shown in FIG. 2, each wall member 31 has a curved restricting surface 31A. As will be described later, each restricting projection 30, formed from a plate-like portion 18 (FIG. 3A) of each of the first and second link members 3, 4, is always in contact with an associated restricting surface 31 A. The engagement members 10 and the wall members 31 can be formed integrally with the support plate 6 by punching or stamping the support plate 6, which is a thin metal plate.

The structure in which the engagement members 10 are bonded to the upper face of the upper film sheet of the membrane switch sheet 7 is the same as the structure disclosed in the specification and drawings of Japanese Patent Application No. 11-32608 (U.S. Pat. Nos. 6,288,457 and 6,417,470), the contents of which are hereby incorporated herein by reference.

Figure 3A:
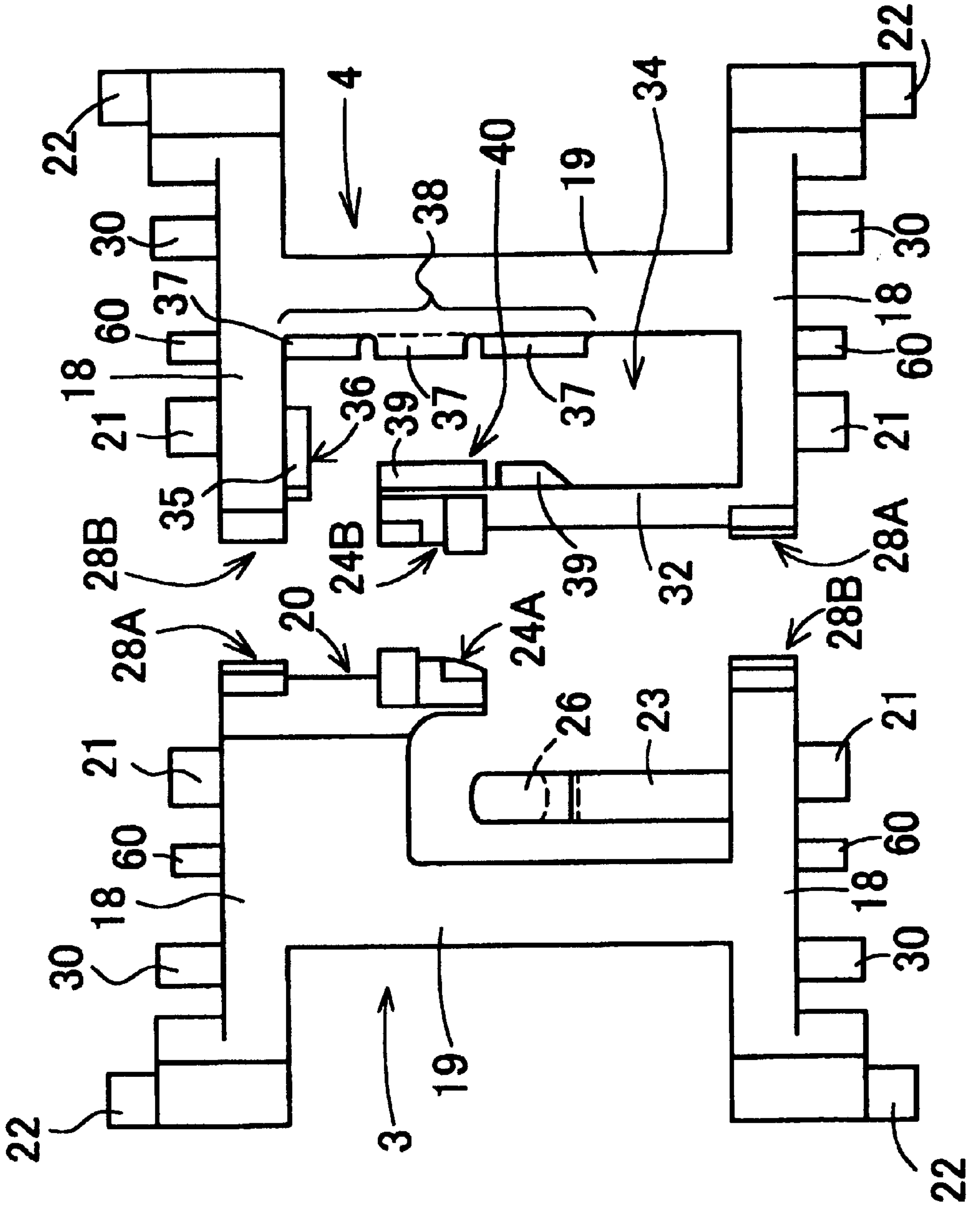
FIG. 3A is a plan view of first and second link members.
Figure 3B:
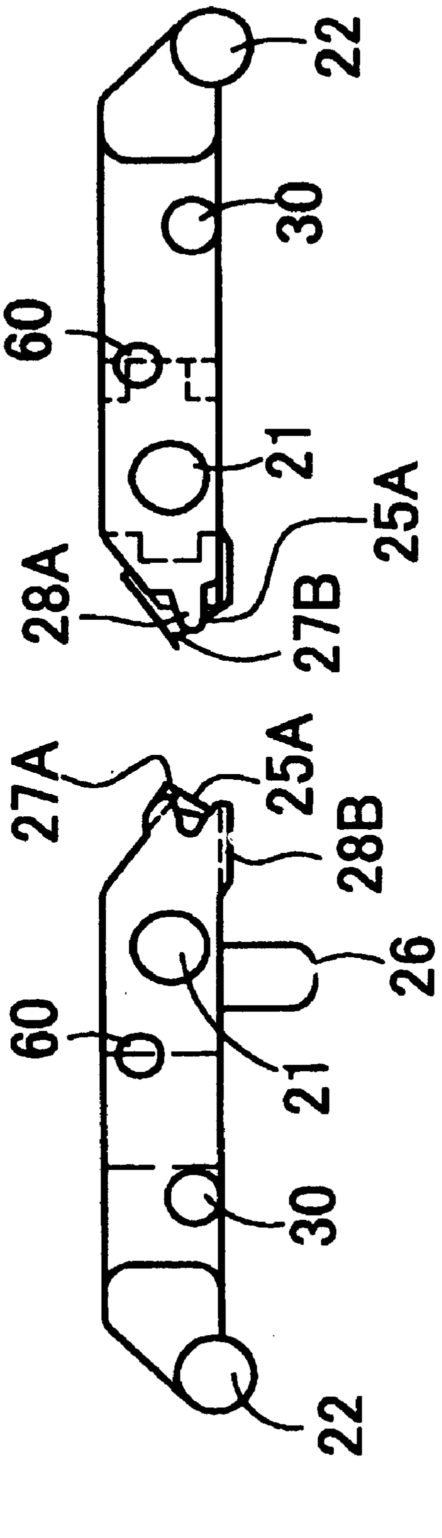
FIG. 3B is a side view of the first and second link members.

Referring now to FIGS. 2, 3, the detailed structure of the first and second link members that form the guide member 5 will be described. The first and second link members 3, 4 are slightly different in structure. FIG. 3A is a plan view of the first and second link members 3, 4, and FIG. 3B is a side view thereof.

In FIGS. 2, 3A, and 3B, the first link member 3 includes a pair of plate-like portions 18, 18, a link portion 19 that connects the plate-like portions 18, and an extending portion 20 that extends, near the base of the link portion 19, inwardly from one end of the plate-like portions 18. These portions 18, 19, 20 are formed integrally with each other and made of polyacetal or other resins. An upper shaft 21 extends outwardly from a position near one end (upper end in FIG. 2 and right end in FIGS. 3A and 3B) of each plate-like portion 18. A lower shaft 22 extends outwardly from the other end (lower end in FIG. 2 and left end in FIGS. 3A and 3B) of each plate-like portion 18. Each upper shaft 21 is pivotally engaged in the engagement groove 8A of the associated engagement member 8 of the key top 2, as described above. Each lower shaft 22 is slidably engaged in the engagement groove 10A of the associated engagement member 10, which is bonded to the surface of the upper film sheet of the membrane switch sheet 7.

A first cam 24A is formed integrally from the distal end of the extending portion 20. As shown in FIG. 3B, the first cam 24A is formed, at its lower position, with a cam surface 25A. A cam apex 27A is provided to border the cam surface 25A and a surface continued from the cam surface 25A. As apparent from FIG. 5, the cam surface 25A keeps the key top 2 at the non-depression position. The first cam 24A has a cam recession (not shown) adjacent to the cam apex 27A (refer to a cam recess 27B of a second cam 24B of the second link member 4 in FIG. 3B). The first cam 24A has the same structure as the second cam 24B of the second link member 4, as will be described later.

Additionally, each plate-like portion 18 is provided with a gear 28 at the end (right end in FIGS. 2, 3A, and 3B)

beyond the upper shaft 21. The gear 28 has one gear tooth 28A or two gear teeth 28B. In FIG. 3B, the gear 28 of the plate-like portion 18 provided on one side (lower side in FIG. 3A) has two gear teeth 28B, while the gear 28 of the plate-like portion 18 provided on the other side (upper side in FIG. 3A) has one gear tooth 28A. FIG. 3B shows the opposing first link member 3 and the second link member 4 in a side view. In the opposite side view, the one and two tooth-gears 28A, 28B are reversed. The gears 28 of the first link member 3 and the gears 28 of the second link member 4 mesh with each other so that the first and second link members 3, 4 operate in synchronism with each other when the key top 2 is moved up and down.

Additionally, an elastic piece 23, made of resin, is formed integrally from an inner wall of one of the plate-like portions 18 (lower plate-like portion 18 in FIG. 3A) so as to extend to generally the center of a distance between the plate-like portions 18. The elastic piece 23 has, at its lower end, a switch pressing portion 26. As will be described later, when the key top 2 is pressed down, the switch pressing portion 26 elastically presses the associated movable electrode on the upper switch sheet of the membrane switch sheet 7 to perform a switching operation with respect to the fixed electrode on the lower film sheet.

Additionally, the restricting projection 30 extends outwardly from a side face of each plate-like portion 18 of the first link member 3. As described above, each restricting projection 30 is always in contact with the restricting surface 31A of the associated wall member 31 of the engagement member 10.

Further, a pinch shaft 60 extends outwardly from the side face of each plate-like portion 18 of the first link member 3. As will be described later, when the key top 2 is in the non-depression state (FIG. 5A), the pinch shaft 60 is in contact with an outer wall 8B of the associated engagement member 8, and the outer wall 8B is interposed between the pinch shaft 60 and the upper shaft 21. When the key top 2 is pulled up for performing maintenance of the key switch device 1, or for other purposes, the pinch shaft 60 cooperates with the upper shaft 21 to pinch therebetween the outer wall 8B of the associated engagement member 8.

Figure 4:
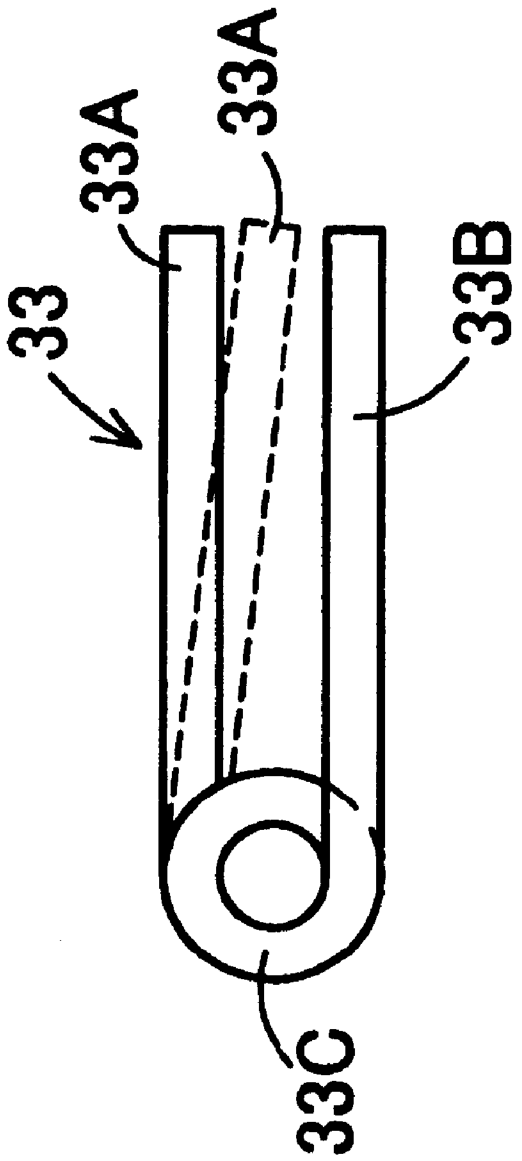
FIG. 4 is a plan view of a torsion spring.

Referring now to FIGS. 2–4, the structure of the second link member 4 will be described. FIG. 4 is a plan view of a torsion spring. In the following description, the same elements as those of the first link member 3 are indicated by the same numbers.

In FIGS. 2–4, the second link member 4 includes a pair of plate-like portions 18, 18, a link portion 19 that connects the plate-like portions 18, and a cantilever portion 32 that extends or cantilevers inwardly from one end (left end of the lower plate-like portion 18 in FIG. 3A) of one of the plate-like portions 18. These portions 18, 19, 32 are formed integrally with each other and made of polyacetal or other resin. An upper shaft 21 extends outwardly from a position near one end (upper end in FIG. 2 and left end in FIGS. 3A and 3B) of each plate-like portion 18. A lower shaft 22 extends outwardly from the other end (lower end in FIG. 2 and right end in FIGS. 3A and 3B) of each plate-like portion 18. Each upper shaft 21 is pivotally engaged in the engagement groove 9A of the associated engagement member 9 of the key top 2, as describe above. Each lower shaft 22 is slidably engaged in the engagement groove 10A of the associated engagement member 10, which is bonded to the surface of the upper film sheet of the membrane switch sheet 7.

The second cam 24B is formed integrally from the distal end of the cantilever portion 32. As shown in FIG. 3B, the second cam 24B is formed, as its lower position, with a cam surface 25A. A cam recess 27B is provided to border the cam surface 25A and a surface continued from the cam surface 25A. As apparent from FIG. 5, the cam surface 25A cooperates with the cam surface 25A of the first link member 3 to keep the key top 2 at the non-depression position. The second cam 24B has a cam apex (not shown) adjacent to the cam recess 27B (refer to the cam apex 27A of the first cam 24A of the first link member 3 in FIG. 3B). The second cam 24B has the same structure as the first cam 24A of the first link member 3.

Additionally, each plate-like portion 18 is provided with a gear 28 at the end (left end in FIGS. 2, 3A, and 3B) beyond the upper shaft 21. The gear 28 has one gear tooth 28A or two gear teeth 28B. In FIG. 3B, the gear 28 of the plate-like portion 18 provided on one side (lower side in FIG. 3A) has one gear tooth 28A, while the gear 28 of the plate-like portion 18 provided on the other side (upper side in FIG. 3A) has two gear teeth 28B.

Additionally, a restricting projection 30 extends outwardly from a side face of each plate-like portion 18 of the second link member 4. As described above, each restricting projection 30 is always in contact with the restricting surface 31A of the associated wall member 31 of the engagement member 10.

Further, a pinch shaft 60 extends outwardly from the side face of each plate-like portion 18 of the second link member 4. As will be described later, when the key top 2 is in the non-depression state (FIG. 5A), the pinch shaft 60 is in contact with an outer wall 9B of the associated engagement member 9, and the outer wall 9B is interposed between the pinch shaft 60 and the upper shaft 21. When the key top 2 is pulled up for performing maintenance of the key switch device 1, or for other purposes, the pinch shaft 60 cooperates with the upper shaft 21 to pinch therebetween the outer wall 9B of the associated engagement member 9.

An area enclosed by the link portion 19, the plate-like portions 18, and the cantilever portion 32 define a spring mounting portion 34 where a torsion spring 33, shown in FIG. 4, is mounted. The torsion spring 33 has a first arm 33A, a second arm 33B, and a coil 33C disposed between the first and second arms 33A, 33B. The torsion spring 33 elastically urges the cantilever portion 32 leftward in FIG. 3A. The spring mounting portion 34 is provided with a first holder 36 having a U-shaped wall portion 35 (FIG. 2) formed on an inner wall of one of the plate-like portions 18, a second holder 38 having three holding pieces 37 formed at the link portion 19 to face the cantilever portion 32, and a third holder 40 having two holding pieces formed on the inner wall of the cantilever portion 32 to face the holding pieces 37.

The end of the first arm 33A of the torsion spring 33 is movably held by the wall portion 35. The second arm 33B is immovably held by the holding pieces 37 of the second holder. The portion of the first arm 33A near the coil 33C is immovably held by the holding pieces 39 of the third holder 40.

As will be described later, when the key top 2 is pressed down, the pressing force acts on the first cam 24A of the first link member 3 and the second cam 24B of the second link member 4, which are in contact with each other. At this time, the extending portion 20 of the first link member 3 is not elastically deformed, and thus the first cam 24A is held there without moving. In contrast, the cantilever portion 32 is deformed, and the second cam 24B moves rightward in FIG. 3A against the urging force of the torsion spring 33. In this state, the first arm 33A of the torsion spring 33 is held by the holding pieces 39 of the third holder 40, and the second arm 33B is held by the holding pieces 37 of the second holder 37. Because the end of the first arm 33A is movable in the U-shaped wall portion 35, the end of the first arm 33A moves rightward in the wall portion 35 as the second cam 24B moves rightward upon deformation of the cantilever portion 32. The torsion spring 33 always urges the cantilever portion 32 in such a direction that the first cam 24A of the first link member 3 and the second cam 24B of the second link member 4 are brought into contact with each other. The elastic force that brings the first and second cams 24A, 24B into contact with each other is generated solely by the torsion spring 33. Thus, the cantilever portion 32 is not required to partially generate the elastic force and can be made of a resin that is relatively flexible at a low cost. As a result, the cantilever portion 32 is unlikely to generate creep and ensures stable switching operations for an extended period of time.

Figure 5A:
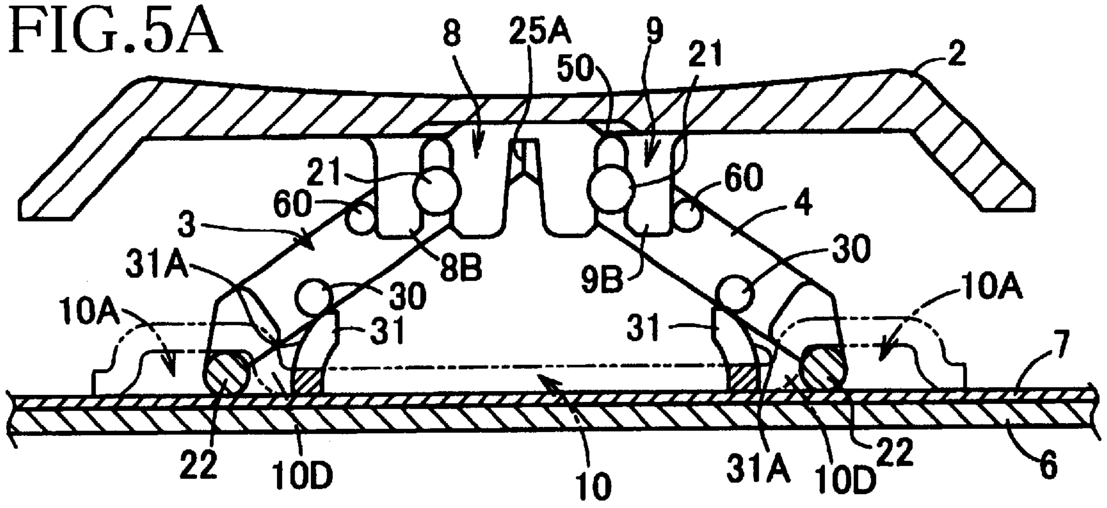
FIGS. 5A, 5B and 5C are schematic views showing a series of actions of the first and second link members when a key top is pressed down to perform a switching operation.
Figure 5B:
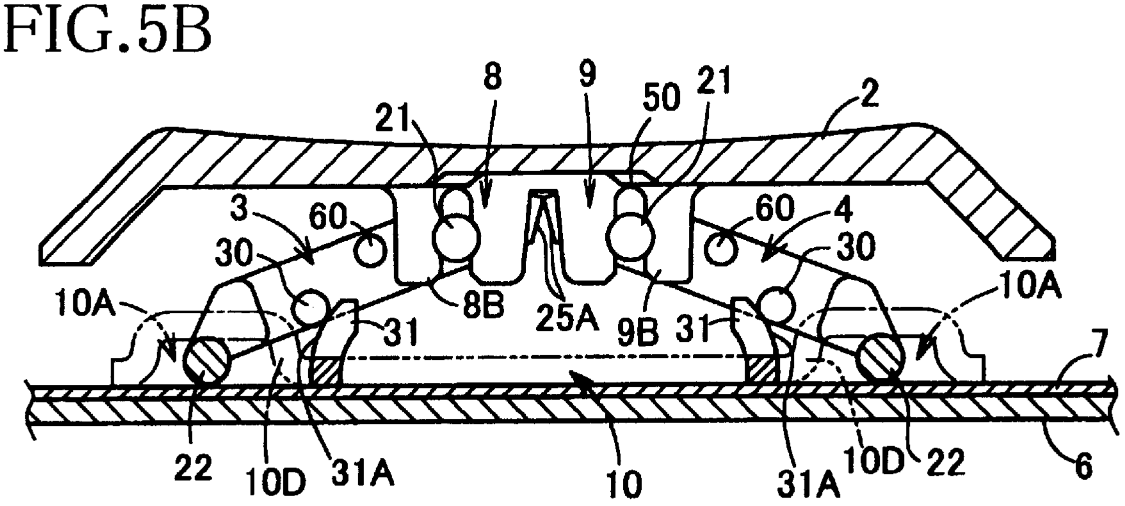
Figure 5C:
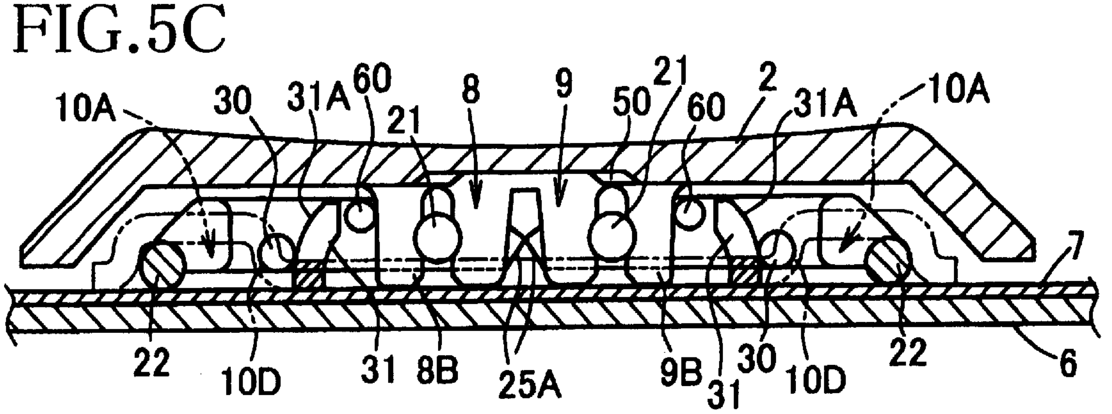

Referring now to FIGS. 5A, 5B, and 5C, the action of the key switch device 1 according to the first embodiment will be described. FIGS. 5A, 5B, and 5C are schematic views showing a series of actions of the first and second link members 3, 4 when the key top 2 is pressed down from the non-depression state till a switching operation is performed.

When the key top 2 is not pressed and is in the non-depression state, the key top 2 is held at the non-depression position, as shown in FIG. 5A. In this state, the cam surface 25A of the first cam 24A of the first link member 3 is in contact with the cam surface 25A of the second cam 24B of the second link member 4. At this time, the urging force of the torsion spring 33 is exerted in such a direction that the cam surfaces 25A are brought into contact with each other. Thereby, as shown in FIG. 5A, the lower shaft 22 of the first link member 3 is in contact with the inner wall of the associated wall portion 10D of the engagement member 10. Likewise, the lower shaft 22 of the second link member 4 is in contact with the inner wall of the associated wall portion 10D of the engagement member 10. Thus, the key top 2 is stably held at the non-depression position.

When the cam surfaces 25A are in contact with each other, the urging force of the torsion spring 33 is exerted in such a direction that the cam surfaces 25A are maintained in contact with each other. This restrains horizontal movement of the key top 2 held at the non-depression position, thereby preventing rattles of the key top 2. At this time, the restricting projection 30 formed from each plate-like portion 10 of each of the first and second link members 3, 4 is in contact with an upper portion of the restricting surface 31A of the associated wall member 31. For the first link member 3, the outer wall 8B of the engagement member 8 is interposed between the upper shaft 21 and the pinch shaft 60, and the pinch shaft 60 is in contact with the outer surface of the outer wall 8B of the engagement member 8. Likewise, for the second link member 4, the outer wall 9B of the engagement member 9 is interposed between the upper shaft 21 and the pinch shaft 60, and the pinch shaft 60 is in contact with the outer surface of the outer wall 9B of the engagement member 9.

When the key top 2 is pressed, the upper shaft 21 of the first link member 3 pivots clockwise, FIG. 5B, in the engagement groove 8A of the associated engagement member 8, and the upper shaft 21 of the second link member 4 pivots counterclockwise in the engagement groove 9A of the associated engagement member 9. At the same time, the lower shaft 22 of the first link member 3 slides leftward in the engagement groove 10A of the associated engagement member 10, and the lower shaft 22 of the second link member 4 slides rightward in the engagement groove 10A of the associated engagement member 10. The restricting projections 30 are guided along the curved restricting surfaces 31A of the wall members 31. Thus, the cooperative action between the restricting projections 30 and the restricting surfaces 31A of the wall members 31 restricts horizontal movement of the key top 2. The cam surface 25A of the first cam 24A of the first link member 3 and the cam surface 25A of the second cam 24B of the second link member 4 are gradually separated from each other, and the cam apex 27A of the first cam 24A and the cam recess 27B of the second cam 24B come into contact with each other. This state is shown in FIG. 5B. At this time, because the cam apex 27A and the cam recess 27B position each other and are not displaced from each other, the first and second cams 24A, 24B move precisely in synchronism with each other.

As shown in FIG. 5A, the pinch shafts 60 of the first and second link members 3, 4 are located at lower diagonal positions with respect to the upper shafts 21.

Thus, as the key top 2 is pushed down and as the first and second link members decrease in inclination and come to lie horizontally, the pinch shafts 60, which have been in contact with the outer walls 8B, 9B of the engagement members 8, 9, separate slightly from the outer walls 8B, 9B, as shown in FIG. 5B.

The state shown in FIG. 5C is brought about by further pressing down the key top 2. The switch pressing portion 26 formed in the elastic piece 23 of the first link member 3 presses the upper film sheet of the membrane switch sheet 7. Then, the movable electrode on the underside of the upper film sheet makes contact with the fixed electrode on the lower film sheet through the switching hole in the film spacer, thereby performing a switching operation. At this time, as shown in FIG. 5C, the lower shafts 22 of the first and second link members 3, 4 are brought into contact with the inner walls of the engagement grooves 10A on the opposite sides from the wall portions 10D.

The elastic piece 23 is elastically deformed when the key top 2 is pressed down further from the state shown in FIG. 5C. Thus, elastic piece 23 absorbs the moving distance of the key top 2 and allows over-travel of the key top 2.

In the state shown in FIG. 5C, where the key top 2 is held down, the pinch shafts 60 of the first and second link members 3, 4 are located at upper diagonal positions with respect to the upper shafts 21. At that time, the pinch shafts 60 make contact with the outer surfaces of the outer walls 8B, 9B interposed between the pinch shafts 60 and the upper shafts 21.

As apparent from the above description, the pinch shafts 60 of the first and second link members 3, 4 do not interfere with the downward movement of the key top 2.

When the key top 2 is released after the completion of the switching operation as described above, the reverse action to the above takes place by the interaction of the first cam 24A of the first link member 3 with the second cam 24B of the second link member 4 and with the urging force of the torsion spring 33, and the non-depression position shown in FIG. 5A returns.

The action of the torsion spring 33 during the depression of the key top 2 will now be described. When the key top 2 is in the non-depression state shown in FIG. 5A, the torsion spring 33 always urges the cantilever portion 32 in such a direction that the first and second cams 24A, 24B are brought into contact with each other. The first and second cams 24A, 24B brought into contact with each other by the urging force of the torsion spring 33 keep the key top 2 at the non-depression position. At this time, as shown in FIG. 2, the first arm 33A (upper arm as portrayed) of the torsion spring 33 is in contact with the closed end of the U-shaped groove of the wall portion 35.

When the key top 2 is pressed down, the pressing force acts on the first cam 24A of the first link member 3 and the second cam 24B of the second link member 4, which are in contact with each other. At this time, the extending portion 20 of the first link member 3 is not elastically deformed, and thus the first cam 24A is inflexibly held in position. In contrast, the cantilever portion 32 is deformed, and the second cam 24B moves rightward (in FIG. 3A) against the urging force of the torsion spring 33. In this state, the first arm 33A of the torsion spring 33 is held by the holding pieces 39 of the third holder 40, and the second arm 33B is held by the holding pieces 37 of the second holder 37. The end of the first arm 33A moves toward the open end of the U-shaped groove of the wall portion 35 of the first holder 36 upon deformation of the cantilever portion 32.

When the key top 2 is released after being held down, the first arm 33A of the torsion spring 33 moves from the open end toward the closed end of the U-shaped groove of the wall portion 35 by its elastic force, and finally contacts the closed end and is held there. In so doing, this interaction of the first and second cams 24A, 24B return the key top 2 to the non-depression position.

When maintenance of the key switch device 1 is performed, the key top 2 is often removed from the key switch device 1 by pulling up the key top 2. In the first link member 3, each pinch shaft 60 is disposed such that the outer wall 8B of the associated engagement member 8 of the key top 2 is interposed between the pinch shaft 60 and the upper shaft 21, which is pivotally engaged in the engagement member 8. Likewise, in the second link member 4, each pinch shaft 60 is disposed such that the outer wall 9B of the associated engagement member 9 of the key top 2 is interposed between the pinch shaft 60 and the upper shaft 21, which is pivotally engaged in the engagement member 9. When the key top 2 is pulled up for performing maintenance or for other purposes, the pulling-up force is exerted such that the pinch shaft 60 cooperates with the upper shaft 21 in the first link member 3 to pinch the outer wall 8B of the associated engagement member 8, and that the pinch shaft 60 cooperates with the upper shaft 21 in the second link member 4 to pinch the outer wall 9B of the associated engagement member 9. Consequently, the holding force to the key top 2 generated between the upper shafts 21 of the first and second link members 3, 4 and the engagement members 8, 9 becomes greater than the holding force to the engagement members 10 generated between the lower shafts 22 of the first and second link members 3, 4 and the engagement grooves 10A of the engagement members 10.

Thus, when the key top 2 is pulled up, the key top 2 is not separated from the first and second link member 3, 4 leaving the first and second link members 3, 4 at the engagement members 10. The key top 2 is always removed together with the first and second link members 3, 4. This facilitates maintenance and reassembling of the key switch device 1.

Further, when the key top 2 is in the non-depression position, each pinch shaft 60 of the first link member 3 is in contact with the outer wall 8B of the associated engagement member 8, and each pinch shaft 60 of the second link member 4 is in contact with the outer wall 9B of the associated engagement member 9. Thus, the pulling-up force generated when the key top 2 is pulled up is exerted more greatly such that the pinch shaft 60 cooperates with the upper shaft 21 in the first link member 3 to pinch the outer wall 8B of the associated engagement member 8, and that the pinch shaft 60 cooperates with the upper shaft 21 in the second link member 4 to pinch the outer wall 9B of the associated engagement member 9. Consequently, the holding force to the key top 2 generated between the upper shafts 21 of the first and second link members 3, 4 and the engagement members 8, 9 becomes much greater than the holding force to the engagement members 10 generated between the lower shafts 22 of the first and second link members 3, 4 and the engagement grooves 10A of the engagement members 10. Thus, when the key top 2 is pulled up, detachment of the first and second link members 3, 4 from the key top 2 is reliably prevented.

As described above, in the key switch device 1 according to the first embodiment, the second cam 24B of the second link member 4 is supported by the cantilever portion 32 extending from the second link member 4, and the cantilever portion 32 is urged by the torsion spring 33 in such a direction that the first cam 24A of the first link member 3 and the second cam 24B of the second link member 4 are brought into contact with each other. The first cam 24A and the second cam 24B, which are in contact with each other, cooperate with the torsion spring 33 to urge the key top 2 upwardly and keep the key top 2 at the non-depression position. This structure also allows the key top 2 to return to the non-depression position when the key top 2 is released after being held down. The key switch device 1 is simply structured without using a rubber spring or a complex urging mechanism, thereby bringing the cost down. Additionally, the first cam 24A and the second cam 24B are always kept in contact with each other by the cantilever portion 32 urged by the torsion spring 33, and their contacting points change according to the vertical movement of the key top 2. By changing the shapes of the first cam 24A and the second cam 24B as required, the tactile feel upon the touch of the key switch device can be freely adjusted.

The cantilever portion 32 is elastically urged by the torsion spring 33, thereby bringing the second cam 24B supported by the cantilever portion 32 into contact with the first cam 24A. The elastic force that brings the first and second cams 24A, 24B into contact with each other is generated solely by the torsion spring 33. Thus, the cantilever portion 32 is not required to partially generate the elastic force and can be made of a resin that is relatively flexible at a low cost. As a result, the cantilever portion 32 is unlikely to generate creep and ensures stable switching operations for an extended period of time.

The second link member 4 is provided with the spring mounting portion 34 where the torsion spring 33 is mounted. Thus, the torsion spring 33 can be unitarily assembled into the second link member 4 and, as a result, the key switch device 1 is compact.

Further, the torsion spring 33 having the first arm 33A and the second arm 33B is used as an urging member for bringing the first cam 24A and the second cam 24B into contact with each other. The first arm 33A is held by the wall portion 35 of the first holder 36 provided at the spring mounting portion 34 and the holding pieces 39, and the second arm 33B is held by the holding pieces 37 of the second holder 38. With such a simple structure for holding the first arm 33A and the second arm 33B, the urging force generated by the interaction between the first arm 33A and the second arm 33B is efficiently transmitted to the cantilever portion 32.

The first arm 33A of the tension spring 33 is movably retained by the U-shaped groove of the wall portion 35 of the first holder 36, and the second arm 33B is immovably held by the holding pieces 37 of the second holder 38. The urging force generated from the torsion spring 33 is transmitted from the first arm 33A, which is in contact with the cantilever portion 32, to the cantilever portion 32. At this time, because the first arm 33A is movably retained by the U-shaped groove of the wall portion 35 of the first holder 36, the first arm 33A moves along the first holder 36 flexibly in response to the reaction force caused by the contacting force generated between the first cam 24A and the second cam 24B. Thus, the first cam 24A and the second cam 24B can always be kept in contact with each other.

The first and second link members 3, 4 are provided with restricting projections 30 that project from the side faces of the plate-like portions. The engagement members 10 are provided with the wall members 31, each having a curved restricting surface and placed near the associated engagement groove 10A at the inner edge of the associated engagement member 10. The cooperative action between the restricting projections 30 and the restricting surfaces 31A restricts horizontal movement of the key top 2. Any additional parts, such as a relatively high guide wall and a positioning member are not required to restrict horizontal movement of the key top 2. The adoption of the above-described simple structure reduces the cost.

Figure 6:
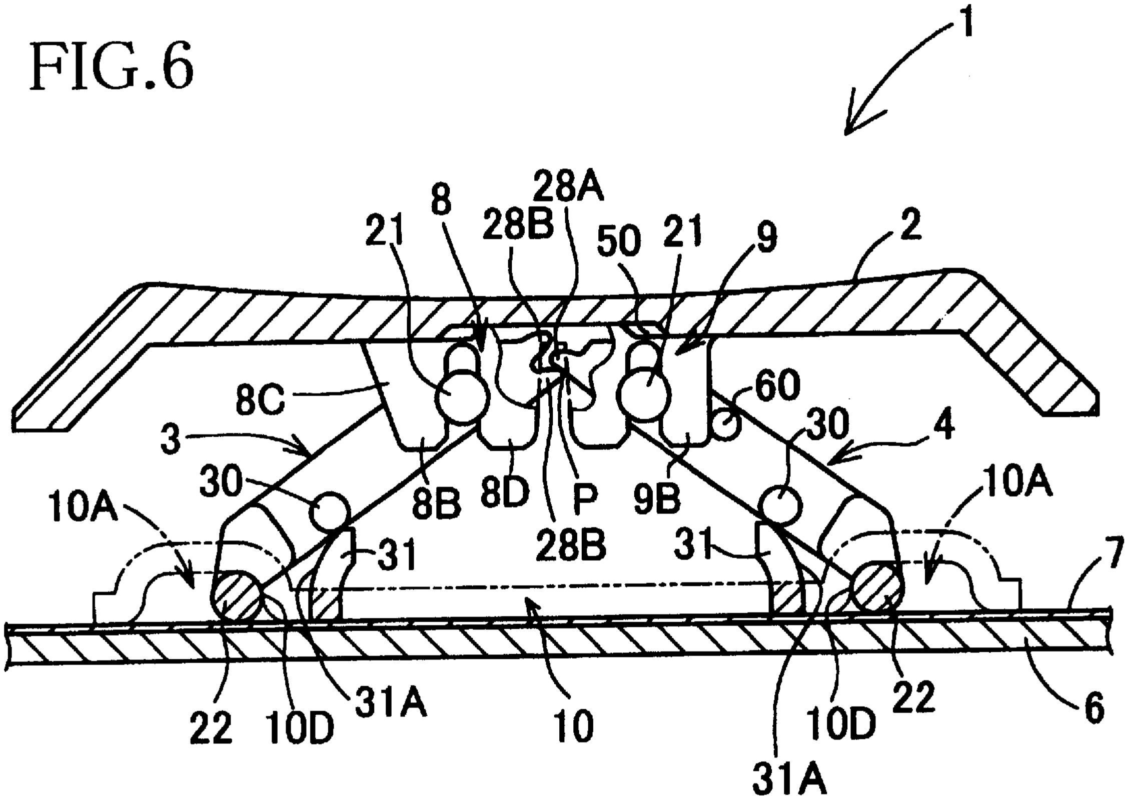
FIG. 6 is a schematic view showing a key switch device according to a second embodiment of the invention when a key top is not pressed down.

Referring now to FIG. 6, a key switch device according to a second embodiment will be described. The key switch device according to the second embodiment has a similar structure to that of the key switch device according to the first embodiment. In the key switch device of the first embodiment, the pinch shafts 60 are formed in both of the first and second link members 3, 4. When the key top 2 is in the non-depression position, the outer wall 8B of each engagement member 8 is interposed between the associated upper shaft 21 and pinch shaft 60 of the first link member 3, and the outer wall 9B of each engagement member 9 is interposed between the associated upper shaft 21 and pinch shaft 60 of the second link member 4.

The key switch device of the second embodiment differs from the key switch device of the first embodiment in that the pinch shafts 60 are formed only in the second link member 4 and the outer wall 9B of each engagement member 9 is interposed between the associated upper shaft 21 and pinch shaft 60 of the second link member 4. Thus, in the following description, the same elements as those of the key switch device 1 of the first embodiment are indicated by the same numbers and the structure specific to the second embodiment will be focused on. FIG. 6 is a schematic view showing the key switch device according to the second embodiment when the key top is in the non-depression position.

In FIG. 6, a taper portion 8C is integrally formed from the outer side (left side in FIG. 6) of an outer wall 8B of each engagement member 8 of a key top 2. The taper portion 8C becomes gradually wider from the lower end of the outer wall 8B toward the underside of the key top 2. With such a taper portion 8C provided, the outer wall 8B becomes gradually wider and higher in rigidity from its lower end toward the underside of the key top 2.

As in the first embodiment, a pinch shaft 60 extends outwardly from a side face of each plate-like portion 18 of a second link member 4. As will be described later, when the key top 2 is in the non-depression position, the pinch shaft 60 is in contact with an outer wall 9B of the associated engagement member 9, and the outer wall 9B is interposed between the pinch shaft 60 and the upper shaft 21. When the key top 2 is pulled up for performing maintenance of the key switch device 1, or for other purposes, each pinch shaft 60 cooperates with the upper shaft 21 to pinch therebetween the outer wall 9B of the associated engagement member 9.

As in the first embodiment, when the key top 2 is in the non-depression position, one gear tooth 28A of a gear 28 of a first link member 3 meshes with two gear teeth 28B of a gear 28 of the second link member 4, and two gear teeth 28B of the gear 28 of the first link member 3 meshes with one gear tooth 28A of the gear 28 of the second link member 4. FIG. 6 shows a state where the two gear teeth 28B of the gear 28 of the first link member 3 meshes with the one gear tooth 28A of the gear 28 of the second link member 4. To be more specific, a lower one of the two gear teeth 28B is in contact with the one gear tooth 28A of the second link member 4 at point P.

The key top 2 is pulled up for performing maintenance of the key switch device 1 of the second embodiment or for other purposes. In the second link member 4, each pinch shaft 60 is disposed such that the outer wall 9B of the associated engagement member 9 of the key top 2 is interposed between the pinch shaft 60 and the upper shaft, which is pivotally engaged in the engagement member 9. The pulling-up force of the key top 2 is exerted such that each pinch shaft 60 cooperates with the upper shaft 21 to pinch the outer wall 9B of the associated engagement member 9. Consequently, the holding force to the key top 2 generated between the upper shafts 21 of the second link member and the engagement members 9 becomes greater than the holding force to the engagement members 10 generated between the lower shafts 22 of the first and second link members 3, 4 and the engagement grooves 10A of the engagement members 10. At this time, by the pulling-up force of the key top 2, the outer wall 9B of each engagement member 9 is pinched between the associated upper shaft 21 and pinch shaft 60, and thus the second link member 4 is locked to the key top 2. At the same time, because the two gear teeth 28B of the first link member 3 are in contact with the one gear tooth 28A of the second link member 4 at point P, the pulling-up force of the key top 2 is exerted such that an inner wall 8D of each engagement member 8 is pushed toward contact P. As a result, when the key top 2 is pulled up, the first link member 3 moves unitarily with the second link member 4.

Thus, when the key top 2 is pulled up, the key top 2 is not removed leaving the first and second link members 3, 4 at the engagement members 10. The key top 2 is always removed together with the first and second link members 3, 4. This facilitates maintenance and reassembling of the key switch device 1.

The taper portion 8C is integrally formed from the outer side (left side in FIG. 6) of the outer wall 8B of each engagement member 8 of the key top 2. The taper portion 8C becomes gradually wider from the lower end of the outer wall 8B toward the underside of the key top 2. With such a taper portion 8C provided, the outer wall 8B becomes gradually wider and higher in rigidity from its lower end toward the underside of the key top 2. The outer wall 8B therefore is unlikely to be elastically deformed and prevents the associated upper shaft 21 of the first link member 3 from being released from the engagement member 8. With this structure, when the key top 2 is pulled up, the key top 2 is reliably removed together with the first and second link members 3, 4.

Further, when the key top 2 is in the non-depression position, each pinch shaft 60 of the second link member 4 is in contact with the outer wall 9B of the associated engagement member 9. Thus, the pulling-up force generated when the key top 2 is pulled up is exerted more greatly such that each pinch shaft 60 cooperates with the upper shaft 21 to pinch the outer wall 9B of the associated engagement member 9. Consequently, the holding force to the key top 2 generated between the upper shafts 21 of the second link member 4 and the engagement members 9 becomes much greater than the holding force to the engagement members 10 generated between the lower shafts 22 of the first and second link members 3, 4 and the engagement grooves 10A of the engagement members 10. Thus, when the key top 2 is pulled up, detachment of the first and second link members 3, 4 from the key top 2 is reliably prevented.

The invention is not limited to the above-described embodiments and various modifications may be made without departing from the spirit and scope of the invention. For example, whereas, in the first and second embodiments, the invention is applied to a notebook-size personal computer, the invention is applicable to other electronic apparatuses provided with a key switch device, such as a typewriter and a word processor.

In the above-described embodiments, a mechanism for restricting horizontal movement of the key top 2 when depressed is provided between the engagement members 10 and the first and second link members 3, 4. Instead, the movement restricting mechanism may be provided between the key top 2 and the link members 3, 4.

Further, the invention may be embodied by the guide member 5 formed by the first and second link members 3, 4 that are journaled in the form of an X.

Whereas, in the above-described embodiments, the engagement members 8, 9 are formed integrally with the underside of the key top 2, they may be formed separately and assembled into a key switch device.

Further, whereas, in the above-described embodiments, the periphery of each outer wall 8B, 9B that is pinched between the pinch shaft 60 and the upper shaft 21 extends perpendicularly from the underside of the key top 2, the outer wall 8B, 9B may be formed with a taper portion that becomes gradually wider from the underside of the key top 2 toward the lower end of the outer wall 8B, 9B. Even with this structure, the pulling-up force generated when the key top 2 is pulled up is resisted as the pinch shaft 60 cooperates with the upper shaft 21 to pinch the outer wall 8B, 9B.

What is claimed is:

1. A key switch device, comprising:

a key top;

a guide member disposed below the key top for supporting the key top to guide vertical movement of the key top, the guide member having a first link member provided with a first upper shaft and a first lower shaft, and a second link member provided with a second upper shaft and a second lower shaft;

a lower engagement member disposed below the key top and next to the guide member, the lower engagement member having a first lower engagement portion in which the first lower shaft is slidably engaged and a second lower engagement portion in which the second lower shaft is slidably engaged;

a first upper engagement member that links the first upper shaft to the key top such that the first upper shaft is pivotally engaged in the first upper engagement member;

a second upper engagement member that links the second upper shaft to the key top such that the second upper shaft is pivotally engaged in the second upper engagement member;

a switching portion that performs a switching operation in accordance with the vertical movement of the key top;

a first pinch portion provided in the first link member such that part of the first upper engagement member is interposed between the first pinch portion and the first upper shaft; and a second pinch portion provided in the second link member such that part of the second upper engagement member is interposed between the second pinch portion and the second upper shaft, wherein the parts of the first and second upper engagement members are pinched therebetween when the key top is pulled up.

2. The key switch device according to claim 1, wherein when the key top is not pressed down, the first pinch portion is in contact with the part of the first upper engagement member, and the second pinch portion is in contact with the part of the second upper engagement member.

3. The key switch device according to claim 1, wherein the first pinch portion is located below a central axis of the first upper shaft of the first link member when the key top is not pressed down, and is located above the central axis of the first upper shaft of the first link member when the key top is pressed down.

4. The key switch device according to claim 1, wherein the first pinch portion is a shaft-like member extending from a side face of the first link member, and the second pinch portion is a shaft-like member extending from a side face of the second link member.

5. The key switch device according to claim 1, further comprising:

a first cam formed in the first link member;

a second cam formed in the second link member to face the first cam;

a cantilever portion that cantilevers from the first link member and supports the first cam; and an urging member that elastically urges the cantilever portion toward the second cam to bring the first cam into contact with the second cam.

6. The key switch device according to claim 5, wherein the urging member is a torsion spring having a first arm contacting the cantilever portion and a second arm facing the first arm, and the first link member includes a mounting portion having a first holder for holding the first arm and a second holder for holding the second arm.

7. The key switch device according to claim 1, further comprising a movement restricting member for restricting horizontal movement of the key top in a course of depression that is disposed between at least one of the first lower engagement portion and the first link member and the second lower engagement portion and the second link member.

8. The key switch device according to claim 7, wherein the movement restricting member includes:

a shaft member extending from a side face of the first or second link member; and a wall member formed near the first or second lower engagement portion for guiding the shaft member in contact therewith when the first or second lower shaft is slid in association with depression of the key top.

9. The key switch device according to claim 1, wherein the switching portion is provided with a circuit board having a movable switch electrode and a fixed switch electrode, the lower engagement member is a chip-shaped member formed to a unit length of the key switch device and formed with a pair of elongated groove-shaped engagement portions corresponding to the first and second lower engagement portions, and fixed on the circuit board, and the first and second lower shafts are engaged in the elongated groove-shaped engagement portions of the lower engagement member.

10. A keyboard provided with at least one key switch device according to claim 1.

11. An electronic apparatus, comprising:

a keyboard for entering data including characters, symbols, and others, the keyboard being provided with a key switch device including:

a key top;

a guide member disposed below the key top for supporting the key top to guide vertical movement of the key top, the guide member having a first link member provided with a first upper shaft and a first lower shaft, and a second link member provided with a second upper shaft and a second lower shaft;

a lower engagement member disposed below the key top and next to the guide member, the lower engagement member having a first lower engagement portion in which the first lower shaft is slidably engaged and a second lower engagement portion in which the second lower shaft is slidably engaged;

a first upper engagement member that links the first upper shaft to the key top such that the first upper shaft is pivotally engaged in the first upper engagement member;

a second upper engagement member that links the second upper shaft to the key top such that the second upper shaft is pivotally engaged in the second upper engagement member;

a switching portion that performs a switching operation in accordance with the vertical movement.of the key top;

a first pinch portion provided in the first link member such that part of the first upper engagement member is interposed between the first pinch portion and the first upper shaft; and a second pinch portion provided in the second link member such that part of the second upper engagement member is interposed between the second pinch portion and the second upper shaft, wherein the parts of the first and second upper engagement members are pinched therebetween when the key top is pulled up;

a display that displays thereon the characters, symbols, and others; and a control unit that controls the display to display thereon the characters, symbols, and others based on the data entered from the keyboard.

12. A key switch device, comprising:

a key top;

a guide member disposed below the key top for supporting the key top to guide vertical movement of the key top, the guide member having a first link member provided with a first upper shaft and a first lower shaft, and a second link member provided with a second upper shaft and a second lower shaft, the first and second link members being engaged with each other at their upper ends;

a lower engagement member disposed below the key top and next to the guide member, the lower engagement member having a first lower engagement portion in which the first lower shaft is slidably engaged and a second lower engagement portion in which the second lower shaft is slidably engaged;

a first upper engagement member that links the first upper shaft to the key top such that the first upper shaft is pivotally engaged in the first upper engagement member;

a second upper engagement member that links the second upper shaft to the key top such that the second upper shaft is pivotally engaged in the second upper engagement member;

a switching portion that performs a switching operation in accordance with the vertical movement of the key top; and a first pinch portion provided in the first link member such that part of the first upper engagement member is interposed between the first pinch portion and the first upper shaft, wherein the part of the first upper engagement member is pinched therebetween when the key top is pulled up.

13. The key switch device according to claim 12, wherein when the key top is not pressed down, the first pinch portion is in contact with the part of the first upper engagement member.

14. The key switch device according to claim 12, wherein the first pinch portion is located below a central axis of the first upper shaft of the first link member when the key top is not pressed down, and is located above the central axis of the first upper shaft of the first link member when the key top is pressed down.

15. The key switch device according to claim 12, wherein the first pinch portion is a shaft-like member extending from a side face of the first link member.

16. The key switch device according to claim 12, further comprising:

a first gear formed near the first upper shaft of the first link member; and a second gear formed near the second upper shaft of the second link member, wherein the first and second link members are engaged with each other to operate in synchronization with each other though mutual contact between the first and second gears.

17. The key switch device according to claim 12, wherein the second upper engagement member has greater rigidity than the first upper engagement member.

18. A keyboard provided with at least one key switch device according to claim 1.

19. An electronic apparatus, comprising:

a keyboard for entering data including characters, symbols, and others, the keyboard being provided with a key switch device including:

a key top;

a guide member disposed below the key top for supporting the key top to guide vertical movement of the key top, the guide member having a first link member provided with a first upper shaft and a first lower shaft, and a second link member provided with a second upper shaft and a second lower shaft, the first and second link members being engaged with each other at their upper ends;

a lower engagement member disposed below the key top and next to the guide member, the lower engagement member having a first lower engagement portion in which the first lower shaft is slidably engaged and a second lower engagement portion in which the second lower shaft is slidably engaged;

a first upper engagement member that links the first upper shaft to the key top such that the first upper shaft is pivotally engaged in the first upper engagement member;

a second upper engagement member that links the second upper shaft to the key top such that the second upper shaft is pivotally engaged in the second upper engagement member;

a switching portion that performs a switching operation in accordance with the vertical movement of the key top;

a first pinch portion provided in the first link member such that part of the first upper engagement member is interposed between the first pinch portion and the first upper shaft, wherein the part of the first upper engagement member is pinched therebetween when the key top is pulled up;

a display that displays thereon the characters, symbols, and others; and a control unit that controls the display to display thereon the characters, symbols, and others based on the data entered from the keyboard.

* * * * *